(12) United States Patent
Howard

(10) Patent No.: US 9,372,060 B1
(45) Date of Patent: Jun. 21, 2016

(54) SOCKET AND WRENCH GAUGE

(71) Applicant: Ronald Howard, Richmond, VA (US)

(72) Inventor: Ronald Howard, Richmond, VA (US)

( * ) Notice: Subject to any disclaimer, the term of this patent is extended or adjusted under 35 U.S.C. 154(b) by 84 days.

(21) Appl. No.: 14/568,895

(22) Filed: Dec. 12, 2014

(51) Int. Cl.
*G01B 3/20* (2006.01)

(52) U.S. Cl.
CPC ..................................... *G01B 3/20* (2013.01)

(58) Field of Classification Search
CPC ........................................................ G01B 3/20
USPC .............. 33/783, 787, 794, 795, 796, 501.05, 33/501.06, 501.08, 679.1
See application file for complete search history.

(56) References Cited

U.S. PATENT DOCUMENTS

| | | | | | |
|---|---|---|---|---|---|
| 1,342,288 | A | * | 6/1920 | Ichiba ....................... | G01B 3/20 33/810 |
| 2,924,017 | A | * | 2/1960 | Sorensen .................. | G01B 3/20 33/796 |
| 4,730,399 | A | * | 3/1988 | Campbell ............ | G01B 5/0025 33/203 |
| 4,843,721 | A | * | 7/1989 | Hoge ........................ | G01B 3/38 33/802 |
| 4,873,771 | A | * | 10/1989 | Wust ........................ | G01B 3/20 33/802 |
| 2002/0100183 | A1 | * | 8/2002 | Matsumiya .............. | G01B 3/20 33/783 |
| 2009/0249632 | A1 | * | 10/2009 | Tyler ........................ | G01B 3/20 33/494 |
| 2009/0288308 | A1 | * | 11/2009 | Hsieh ....................... | B25B 13/04 33/810 |
| 2014/0059873 | A1 | * | 3/2014 | Brookover ............... | G01B 3/20 33/512 |
| 2016/0061575 | A1 | * | 3/2016 | Magnier ................... | G01B 3/20 33/810 |

\* cited by examiner

*Primary Examiner* — G. Bradley Bennett

(57) ABSTRACT

A socket and wrench gauge provides for the portable and precise measurement of the dimension of a bolt or nut across the flats thereof, in order to determine the precise size of the socket or wrench required for use therewith. The socket and wrench gauge consists of two parallel jaws with gripping points, with the first jaw and gripping point extending laterally from an elongated slide scale and the opposite jaw and gripping point extending laterally from an elongated body receiver and raceway through which the slide scale operates. The scale consists of two linear rows of dimensional numbers thereon, with each of the numbers corresponding to a distance between the two jaws and gripping points. The numbers are placed longitudinally along the face of the scale for simplicity and greater legibility. The body receiver and raceway channel includes two coinciding reference marks placed laterally thereacross, which in combination with the longitudinal array of dimensional numbers, results in a singular dimensional number being exactly aligned with a corresponding reference mark for any measurement. The scale numbers correspond with the standardized size of sockets and wrenches used in industry, and the socket and wrench gauge may include inch, fractional inch and metric measurements longitudinally on the face side. The socket and wrench gauge may be formed of various rigid plastics or machined using soft or hard metals as desired. The socket and wrench gauge may be made sufficiently small so as to fit within a modern shirt or pant pocket, in order to be readily available to the user at all times.

8 Claims, 2 Drawing Sheets

SOCKET AND WRENCH GAUGE

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

By the present invention, an improved socket and wrench gauge is disclosed.

Accordingly, one of the objects of the present invention is to provide an improved socket and wrench gauge which is adapted for the determination of the sizes of sockets and wrenches belonging to groups of predetermined standard and metric sizes, by the measurement of a corresponding nut or bolt head therewith.

Another of the objects of the present invention is to provide an improved socket and wrench gauge which includes opposed jaws providing for the placement of a nut or bolt therebetween, with one jaw extending laterally from an elongate scale and the opposite jaw extending laterally from a body raceway slidably interlocked to the scale portion.

Yet another of the objects of the present invention is to provide an improved socket and wrench gauge which elongate scale portion dimensional markings are longitudinally and incrementally arranged across the face of the scale in order to spread the reference marks for greater legibility, and which body raceway or includes a plurality of reference marks disposed laterally thereacross, so that only one of the reference marks is exactly aligned with only one corresponding scale reference mark at any one time.

Still another of the objects of the present invention is to provide an improved socket and wrench gauge which may be 2 similarly configured on upper face side of the scale slide, thereby providing for the determination of socket and wrench sizes of two different systems, such as the inch and fractional inch standard and the metric standard.

A further object of the present invention is to provide an improved socket and wrench gauge which may be formed of rigid plastic and or machined of soft or hard metals as desired.

An additional object of the present invention is to provide an improved socket and wrench gauge which is sufficiently small in size as to fit within a shirt pocket or tool box for ready availability.

Still another of the object of the present invention is to provide an improved socket and wrench gauge which may be manually operated eliminating a need for an electronic harness or power supply for precise dimensional readings.

Another object of the present invention is to provide an improved socket and wrench gauge which may be operated in various environments without compromise to its intended function.

A final object of the present invention is to provide an improved socket and wrench gauge for the purposes described which is inexpensive, manually operated, dependable and fully effective in accomplishing its intended purpose.

With these and other objects being provided, which will more readily appear as the nature of the invention is better understood, the invention consists in the novel combination and arrangement of parts hereinafter more fully described, illustrated and claimed with reference being made to the attached drawings.

SUMMARY OF THE INVENTION

To summarize the current socket and wrench gauge provides an extremely convenient, reliable, precise, handy means of determining the correct socket or wrench to use for a particular fastener by measuring the opposite flats of a nut or bolt head. And so, the current socket and wrench gauge is utilized to provide a simple an accurate result eliminating wasted efforts, time and expense in determining the correct dimension for a socket or wrench to secure or remove the corresponding fastener in question.

It is to be understood that the present invention is not limited to the sole embodiment described above, but encompasses any and all embodiments within the scope of the following claims.

DETAILED DESCRIPTION OF THE INVENTION

Figure 1A:
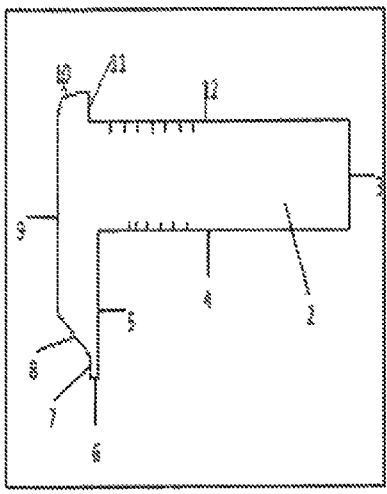
FIG. 1A Shows one thin, narrow, and flat body formed of rigid plastic and or machined in hard or soft metal with beveled edges along the longitudinal edges to allow for interlocking and a calibrated scale along the surface of the elongated body.
Figure 1B:
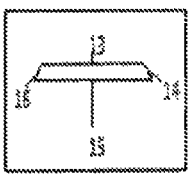
FIG. 1B Shows the end view of the elongated body for FIG. 1A.
Figure 2A:
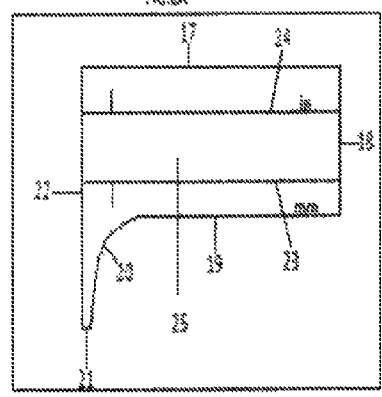
FIG. 2A Shows one thin, narrow, and flat body formed of rigid plastic and or machined in hard or soft metal with an elongated longitudinal raceway channel and two reference marks on the surface of the elongated body.
Figure 2B:
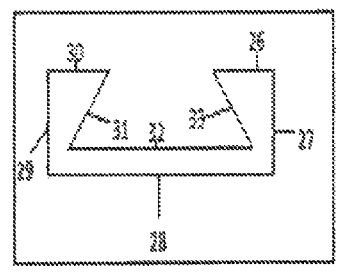
FIG. 2B Shows the end view of the elongated body for FIG. 2A.
Figure 3:
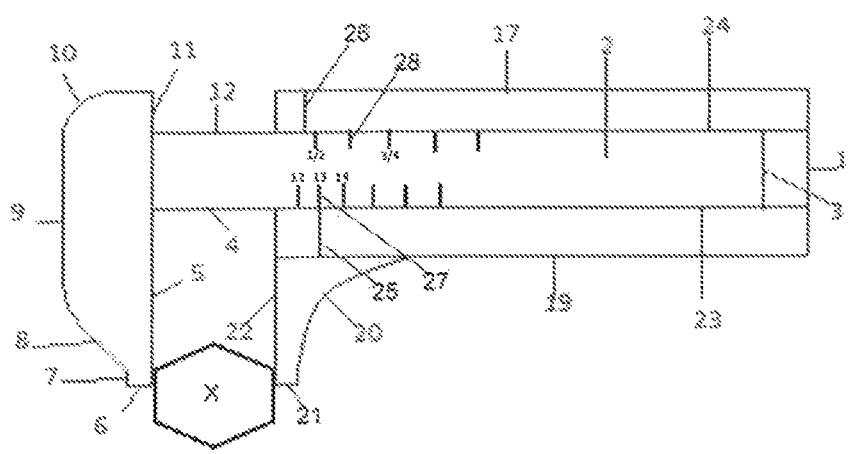
FIG. 3 Shows the interlocked bodies of FIG. 1A and FIG. 2A and depicts its typical function.

A preferred embodiment of the socket and wrench gauge is illustrated in FIG. 1A top view, FIG. 1B end view, FIG. 2A top view, FIG. 2B end view, FIG. 3 top view.

The preferred embodiment has a rigid base FIG. 1A 2 and FIG. 2A 25 of uniform cross section.

In the preferred embodiment, the base is a rigid plastic however; the base can consist of any other material that can be machined such as a soft and or hard metal.

A preferred embodiment of the slide scale body FIG. 1A 2 consists of a first or slide scale jaw and gripping point FIG. 1A 5-8 extending laterally from the thin, flat, narrow, and elongated slide scale body FIG. 1A 2 at one end and terminating at the opposite end FIG. 1A 3 with a straight edge. The slide scale body FIG. 1A 2 is typically 3 mm to 5 mm in thickness and has an overall dimension of roughly 90 mm×43 mm (rectangle shape). The longitudinal edges FIG. 1A 4 and 12 are beveled FIG. 1B 14 and 16. The slide scale body end view FIG. 1B has a relative dimension of roughly 3 mm to 5 mm in thickness and 15 mm to 18 mm in width.

In a preferred embodiment FIG. 2A 17 through 25 consists of one terminating end at a gripping point FIG. 2A 20 through 22 and terminating at the opposite end FIG. 2A 19 with a straight edge.

In the preferred embodiment FIG. 2A consists of a raceway channel running longitudinally FIG. 2A 23 and 24. The base of FIG. 2A is typically 3 mm to 8 mm in thickness and has an overall dimension of roughly 81 mm×43 mm (rectangle shape). FIG. 2B (end view) consists of FIG. 2B 26 through 33 and has an overall dimension of roughly 3 mm to 5 mm in thickness and 25 mm to 28 mm in width.

In the preferred embodiment FIG. 2B consists of an interior beveled edge FIG. 2B 31 and 33 and a flat bottom FIG. 2B 32.

In a preferred embodiment the invention FIG. 3 1 typically consists of two narrow, thin, flat, and elongated interlocking bodies of which a narrow, thin, flat, and elongated slide scale FIG. 3 2, which scale FIG. 3 2 is slidably installed in a raceway channel FIG. 3 3 which interlocks said slide scale FIG. 3 2 with a narrow, thin, and flat body receiver FIG. 3 4. The slide scale FIG. 3 2 includes a first or slide scale jaw and gripping point FIG. 3 5 extending laterally from the first end FIG. 3 6 thereof, which jaw and gripping point FIG. 3 5 is disposed opposite a second or body receiver jaw and gripping point FIG. 3 7 extending laterally from the first end FIG. 3 8 of the body receiver FIG. 3 4. The body receiver FIG. 3 4 may include a slide raceway channel FIG. 3 3 having open end FIG. 3 9, through which a slide scale protrudes. The slide raceway channel FIG. 3 3 provides a user of the present socket and wrench gauge FIG. 3 1 to adjust the scale FIG. 3 2 relative to the body receiver FIG. 3 4, by manipulating the slide scale FIG. 3 2 in the raceway channel FIG. 3 3 allowing contact to the measured surface FIG. 3 10.

Focusing particularly on FIG. 1A of the drawings, the present invention will be seen to relate to a socket and wrench gauge FIG. 3 1, which provides for the checking of the dimension across the opposite flats of a nut or bolt head consisting of a finite number of nuts and bolts of standard sizes. In the United States, two such standards are generally used: The fractional inch and inch scale, and the metric scale. Each of the standardized dimensional scales consists of a finite number of nut and bolt dimensions which progress incrementally from a smallest to a largest size. As only a limited number of precise sizes are contained in each scale, a gauge or the like providing for the determination of the exact size of any socket of wrench size, need include only a relatively small number of finite reference marks, rather than including the wide range of dimensions possible for the measurement. An example of the above can be expressed by understanding the limits within the group or series of fasteners. When measuring a fractional inch and inch scale nuts and bolt heads, an individual need only provide for forty different sizes, encompassing a range from five thirty seconds of an inch to two and three eighths inches, in order to express all of the standard dimensions in that dimensional value set, inclusive.

As with most nuts and bolts, their individual dimensions are not marked in any distinct way leaving the individual user to exact a precise dimension of socket or wrench visually by estimating the nut or bolts dimensions, by trial and error through the use of several different sized sockets and wrenches for the securing or removal the desired nut or bolt, or the user must measure the dimension, in order to limit the range of possible dimensions in selecting the precise sized tool for use thereon.

In conclusion, the present socket and wrench gauge FIG. 3 1 consists of a predetermined, finite range of numerical reference marks of which each of said reference marks represents a singular precise standard inch, fractional inch or metric sized socket and wrench. The socket and wrench gauge FIG. 3 1 provides visualization of inch, fractional inch, and metric dimensions simultaneously to the user.

The current socket and wrench gauge FIG. 3 1 is used by placing the head of a nut or bolt, shown designated as an (X) in FIG. 3, between the two jaws and gripping points FIGS. 3 6 and 21, and the jaws and gripping points are placed in direct contact the opposite flats of the nut or bolt designated as an (X) in FIG. 3. The precise dimension of socket or wrench needed to secure or remove said nut or bolt will be visible by the exact alignment of a singular numerical value centered over or under a reference mark FIG. 2A 25 and 26 other numerical values provided on the scale will not align precisely with the reference mark FIG. 2A 25 and 26 since they have a predetermined representation for a singular dimension provided with the scale.

The illustration of FIG. 3 also allows for a visual example of the checking of a nut consisting of an opposite and across flat head dimension of three quarters of an inch. In addition it should be noted that with the two jaws and gripping points FIG. 3 6 and 21 securely contacting opposite sides of the nut head flats the reference marks FIG. 3 25 and 26 the metric dimension "13" of the slide scale FIG. 3 27 correctly centered over the lower reference mark FIG. 3 25. It will be noted that the next smaller dimension, i.e., "12" in the lower column FIG. 3 28 to the left of the "13" dimension FIG. 3 27 on the sliding scale FIG. 3 2, is not centered over a reference mark FIG. 3 25 indicating that it is not the correct dimension for the nut or bolt FIG. 3 X being fitted. The next closest dimensional number is to the right of the correct "13" dimension FIG. 3 27 of the sliding scale FIG. 3 2 centered over the lower reference mark FIG. 3 25. As this number is one millimeter larger it is referenced to the right of the correct dimension "13" shown in FIG. 3 27. Additional numerical dimension appear in the upper longitudinal row FIG. 3 28 of the sliding scale FIG. 3 2 but will not correctly center over the reference mark FIG. 3 26 with only a singular dimension being able to precisely align with a reference mark FIG. 3 25 26 at any one time.

The current socket and wrench gauge FIG. 3 1 is used by placing the head of a nut or bolt, shown designated as an (X) in FIG. 3, between the two jaws and gripping points FIG. 3 6 and 2, and the jaws and gripping points are placed in direct contact the opposite flats of the nut or bolt designated as an (X) in FIG. 3. The precise dimension of socket or wrench needed to secure or remove said nut or bolt will be visible by the exact alignment of a singular numerical value centered over or under a reference mark FIG. 2A 25 and 26 other numerical values provided on the scale will not align precisely with the reference mark FIG. 2A 25 and 26 since they have a predetermined representation for a singular dimension provided with the scale.

The illustration of FIG. 3 also allows for a visual example of the checking of a nut consisting of an opposite and across flat head dimension of three quarters of an inch. In addition it should be noted that with the two jaws and gripping points FIG. 3 6 and 21 securely contacting opposite sides of the nut head flats the reference marks FIG. 3 25 and 26 the metric dimension "13" of the slide scale FIG. 3 27 correctly centered over the lower reference mark FIG. 3 25. It will be noted that the next smaller dimension, i.e., "12" in the lower column FIG. 3 28 to the left of the "13" dimension FIG. 3 27 on the sliding scale FIG. 3 2, is not centered over a reference mark FIG. 3 25 indicating that it is not the correct dimension for the nut or bolt FIG. 3 X being fitted. The next closest dimensional number is to the right of the correct "13" dimension FIG. 3 27 of the sliding scale FIG. 3 2 centered over the lower reference mark FIG. 3 25. As this number is one millimeter larger it is referenced to the right of the correct dimension "13" shown in FIG. 3 27. Additional numerical dimension appear in the upper longitudinal row FIG. 3 28 of the sliding scale FIG. 3 2 but will not correctly center over the reference mark FIG. 3 26 with only a singular dimension being able to precisely align with a reference mark FIG. 3 25 26 at any one time.

I claim:

1. A socket and wrench gauge configured, formed and or machined for the optimal selection of the size of a machined fastener of a group of machined fasteners having a predetermined number of different standard and metric sizes and for determination of a correspondingly sized socket and wrench for use therewith, said socket and wrench gauge comprising:
   a. a narrow, thin, outward facing, and elongated slide scale, said slide scale including a first end having a first jaw and gripping point extending laterally therefrom and a first face having a plurality of socket and wrench size numbers with reference marks disposed substantially longitudinally thereacross to form a linear row of socket and wrench size numbers thereon, with each of said numbers corresponding to a standard or metric socket and wrench size, and;
   b. a narrow, thin, and flat body receiver including a raceway channel extending therethrough machined to fit snuggly about said slide scale, said raceway channel having a first end with a second jaw and gripping point extending laterally therefrom and opposite said first jaw and gripping point of said slide scale, and a first face having a plurality of reference marks thereacross in a lateral longitudinal array, with each of said reference marks being aligned with a corresponding socket and wrench size of said linear row of said socket and wrench size numbers when said slide is placed within said channel of said body receiver raceway, whereby;
   c. said first jaw and gripping point and said second jaw and gripping point are closed about each side of a nut or bolt placed therebetween by sliding said slide scale within said channel of said body raceway, and the size of the wrench and socket is determined having an exact alignment with a corresponding single one of said socket and wrench size numbers and reference marks, thereby providing a precise determination of the corresponding socket and wrench size required.

2. The socket and wrench gauge of claim 1, wherein: each of said socket and wrench size numbers disposed upon said slide scale includes a lateral socket and wrench size number reference mark arranged at least to each side thereof, and said body raceway includes a plurality of reference marks laterally arranged across thereof said raceway with the alignment of said reference mark line with a singular one of said lateral socket and wrench size number reference marks providing a precise determination of the size of a socket and wrench used for said nut and bolt placed snuggly between said first jaw and gripping point and said second jaw and gripping point.

3. The socket and wrench gauge of claim 1, wherein: said slide scale and said body raceway are each formed having a generally elongated, rectangular geometry, with each said jaw and gripping point, said slide scale, and said body receiver each having a smooth surface and straight edges thereon.

4. The socket and wrench gauge of claim 1, wherein: said socket and wrench size numbers arranged upon said slide scale are each disposed longitudinally from said first jaw and gripping point a dimensional distance correlating to each of said numbers, with said numbers comprising standard fractional inch and inch measurements.

5. The socket and wrench gauge of claim 1, wherein: said socket and wrench size numbers arranged upon said slide scale are each spaced longitudinally from said first jaw and gripping point a dimensional distance correlating to each of said numbers, with said numbers comprising metric measurements.

6. The socket and wrench gauge of claim 1, wherein: said slide scale includes two said longitudinal rows of said socket and wrench size numbers, and said body raceway contains a plurality of reference marks disposed laterally thereacross, with each of said reference marks being aligned with a corresponding number of said longitudinal row of socket and wrench size numbers when said slide scale is slidingly placed within said slide scale channel of said body raceway.

7. The socket and wrench gauge of claim 1, wherein: said socket and wrench gauge has a maximum width of one and three quarters of an inch, a maximum thickness of one quarter of an inch, and a maximum length of three and one quarter inches, and is formed and or machined to easily rest within a clothing pocket or storage container.

8. The socket and wrench gauge of claim 1, wherein: said socket and wrench gauge is formed and or machined of rigid materials selected from the group consisting of plastic, soft and hard metals.

* * * * *